United States Patent [19]

Muller-Erwig

[11] Patent Number: 5,064,364
[45] Date of Patent: Nov. 12, 1991

[54] APPARATUS FOR THE CONTINUOUS COATING OF CYLINDRICAL WORKPIECES WITH A RESILIENT MATERIAL

[75] Inventor: Horst Muller-Erwig, Neustadt, Fed. Rep. of Germany

[73] Assignee: Hermann Berstorff Maschinenbau GmbH, Hanover, Fed. Rep. of Germany

[21] Appl. No.: 524,869

[22] Filed: May 18, 1990

[30] Foreign Application Priority Data

May 29, 1989 [DE] Fed. Rep. of Germany ....... 3917372

[51] Int. Cl.[5] .............................................. B29C 47/02
[52] U.S. Cl. ..................................... 425/114; 264/174; 264/209.2; 425/381; 425/382.3
[58] Field of Search ...................... 425/113, 114, 382.3, 425/131.1, 133.1, 376.1, 380, 381, 205; 264/209.2, 174

[56] References Cited

U.S. PATENT DOCUMENTS

| 815,571 | 3/1906 | Williams | 425/114 |
| 3,296,659 | 1/1967 | Okazaki | 425/114 |
| 3,979,488 | 9/1976 | Greenhalgh et al. | 425/205 |
| 4,832,588 | 5/1989 | Rasmussen | 425/382.3 |
| 4,838,777 | 6/1989 | Weber | 425/114 |

FOREIGN PATENT DOCUMENTS 0231976 8/1987 European Pat. Off. .

Primary Examiner—Jay H. Woo
Assistant Examiner—Robert B. Davis
Attorney, Agent, or Firm—Foley & Lardner

[57] ABSTRACT

An apparatus is provided for the continuous coating of cylindrical workpieces with a mixture of rubber or thermoplastic plastics material. The arrangement includes an extrusion device, a coating head and a flow channel, which connects the extrusion device to the coating head. The coating head includes a hollow barrel, having a rotatable sleeve-shaped material distributor coaxially disposed therein. One or more conveyor flights are helically disposed on the periphery of the distributor. The discharge opening of the flow channel into the coating head end has a dimension corresponding to an axial pitch length of the flights on the periphery of the distributor.

7 Claims, 3 Drawing Sheets

APPARATUS FOR THE CONTINUOUS COATING OF CYLINDRICAL WORKPIECES WITH A RESILIENT MATERIAL

FIELD OF THE INVENTION

The present invention relates to an apparatus for the continuous coating of cylindrical workpieces with a resilient material. More particularly, the present invention relates to an apparatus of the type which comprises an extrusion device for plasticising a mixture of rubber or thermoplastic plastics material with which the workpieces are to be coated, a coating head for receiving the plasticised material and for coating the workpieces and a flow channel interconnecting the extrusion device and the coating head.

BACKGROUND OF THE INVENTION AND PRIOR ART DISCUSSION

An apparatus of this general type is disclosed in European Patent Specification No. 0231976A2. By means of such an apparatus, metallic polygraphic rollers and the like may be coated with a layer of rubber. Such prior specification discloses a crosshead extruder having an extruder housing with a throughlet passage for cylindrical workpieces to be coated with a highly viscid material such as unvulcanized rubber, an extruder nozzle for defining the thickness of such coating, and a side inlet for supply of a pressurized coating material to the extruder housing. The extruder is provided with an interior power driven worm member for receiving the pressurized inlet material and for conveying it around the workpiece passage and forwardly towards the extruder nozzle whereby it is ensured that the coating material is present at the extruder nozzle all around the workpieces even if these are of a large diameter. For counteracting a rotational movement of the coating material exiting the extruder nozzle, the worm member has a protruding front end core portion which is held non-rotatably by being mounted on a holding pipe which projects rearwardly through the central passage of the worm member and beyond the rear end thereof, is non-rotatably anchored to the chassis of the crosshead extruder.

The advantages of such an apparatus are that cylindrical workpieces can be coated in a single operation and that the roller shells thus produced do not have any flow marks, either in the longitudinal direction or around their periphery, thereon. This is because of the presence of the mandrel retaining flights, which retain a guide tube.

If a roller coating operation is effected by coating the rollers helically, it is possibie that undesirable coating material malformations will be produced, particularly in those regions where overlap or connection of the windings take place. After the rubber shell or coating has been vulcanized, it is consequently necessary for the surface of the coated roller to be ground to make it smooth. A coated roller produced in such manner is, nevertheless, adequate for many purposes. However, if, for example, metallic polygraphic rollers are to be coated with a layer of rubber, the coated roller surface must be produced very accurately. The surface thereof must be extremely smooth, and it is not permissible for the layer of rubber to have even the smallest air pocket formed therein. This is because such bubbles are burst by the subsequent grinding process and, in consequence, tiny holes would be left in the surface of the coating.

Even if the coating is effected by means of the apparatus disclosed in European Patent Specification No. 0231976A2, the sleeve-shaped material distributor produces an uneven coating of rubber material. This is disadvantageous in that, firstly, there is a risk of air bubbles or pockets being produced and, secondly a coating of irregular thickness is produced. A subsequent grinding operation is therefore required in order to remove or minimize differences in the thickness of the coating shell.

OBJECTS OF THE INVENTION

The present invention seeks to provide an apparatus which is of the general type described in European Patent Specification No. 0231976A2 but which does not suffer from the above-mentioned disadvantages. More particularly, the present invention seeks to provide an apparatus which is used to coat workpieces with a resilient material so that the coating shell produced has an extremely uniform thickness, thereby minimizing the subsequent grinding of the material and ensuring that the minimum possible amount of the very expensive coating rubber or plastics material mixture is wasted.

SUMMARY OF THE INVENTION

According to the present invention, there is provided an apparatus for the continuous coating of cylindrical workpieces or the like with a resilient material comprising an extrusion device for plasticizing the resilient material, said extrusion device defining an outlet for said plasticized material, flow channel means communicating with said outlet of said extrusion device, said flow channel means defining an inlet for receiving said plasticized material from said extrusion device and an outlet for said plasticized material, and coating head means communicating with said flow channel means and defining first inlet means for receiving said plasticized material from said outlet of said flow channel means and second inlet means for receiving said workpiece to be coated, said coating head means comprising hollow barrel means; plasticized material distributor means rotatably mounted within the hollow interior of said barrel means, said distributor means comprising a hollow sleeve, said sleeve including an external surface, at least one screw flight helically disposed around said external surface; drive means for rotating said distributor means with respect to said barrel means, said drive means comprising a drive motor and transmission means driven by said motor, said transmission means co-operatively engaging with said distributor means upstream of said first inlet means defined by said barrel means; hollow tube means co-axially mounted within the hollow interior of said distributor means and means for retaining said hollow tube means, said hollow tube means having an upstream end in the region of said transmission means and an opposed downstream end said retaining means retaining said upstream end; guide sleeve means disposed within said hollow tube means for guiding said workpieces through said coating head means; mounting means for the guide sleeve means to permit axially displacement of said guide sleeve means with respect to said hollow tube means, and means for retaining said guide sleeve means in a desired location with respect to said hollow tube means, said retaining means also being disposed at said upstream end of said hollow tube means wherein said at least one screw flight has a pitch length and said outlet of said flow channel defines a discharge aperture, the cross-section of said discharge aperture having a major dimension, said major dimension corresponding to said pitch length.

By ensuring that the cross-sectional area of the discharge aperture of the flow channel into the coating head end has dimension corresponding to the axial pitch length of a conveyor flight helically disposed around the periphery of the distributor for the plasticized material, it is ensured that the portion of the screw thread into which the material is discharged is completely filled with such material mixture during a single rotation of the distributor and the entire thread is continuously and completely filled as the distributor continues to rotate. Thus, for example, the aperture may be in the form of an elongate slot and the length of the slot corresponds to the axial pitch length.

Since both the beginning and end regions of the thread are continuously filled with the rubber mixture as they pass beneath the discharge orifice, the formation of air pockets or bubbles is precluded. Moreover, since the screw threads are filled in a very uniform manner, the coating operation is effected in a very even manner. This is evidenced by the fact that the coating produced has a very uniform thickness.

In consequence, only very thin layers of excess rubber thermoplastics material must be removed by grinding. Accordingly the grinding operation is effected very rapidly, and only a very small amount of the rubber or thermoplastics material, which is very expensive, is lost. The thickness tolerances of the shell can be reduced by as much as 80%.

In an advantageous manner, the cross-sectional area of the inlet to the flow channel from the extrusion device is selected so as to correspond substantially to the cross-sectional area of the outlet from the channel into the coating head. This measure ensures that laminar flows of different speeds are not set up because there is no drop in pressure in the material in the flow channel.

BRIEF DESCRIPTION OF THE DRAWINGS

The present invention will be further described, by way of example, with reference to the accompanying drawings, in which.

DESCRIPTION OF PREFERRED EMBODIMENT

Figure 1:
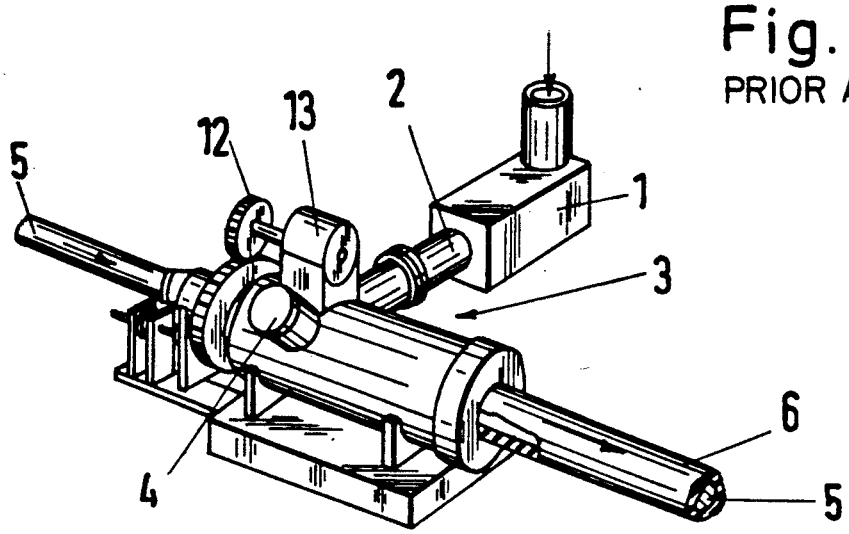
FIG. 1 is a perspective view of a known apparatus for coating cylindrical bodies with a resilient material.
Figure 4:
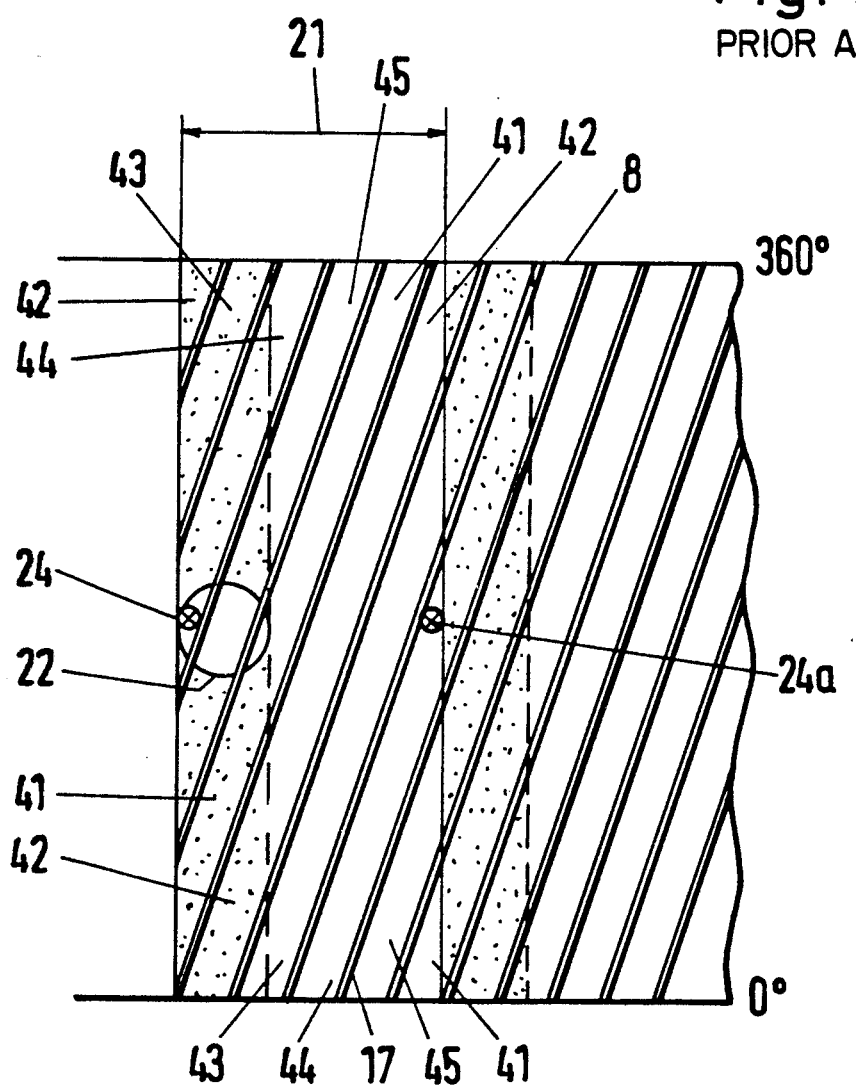
FIG. 4 shows a development of the surface of a sleeve-shaped material distributor forming part of a known apparatus.
Figure 2:
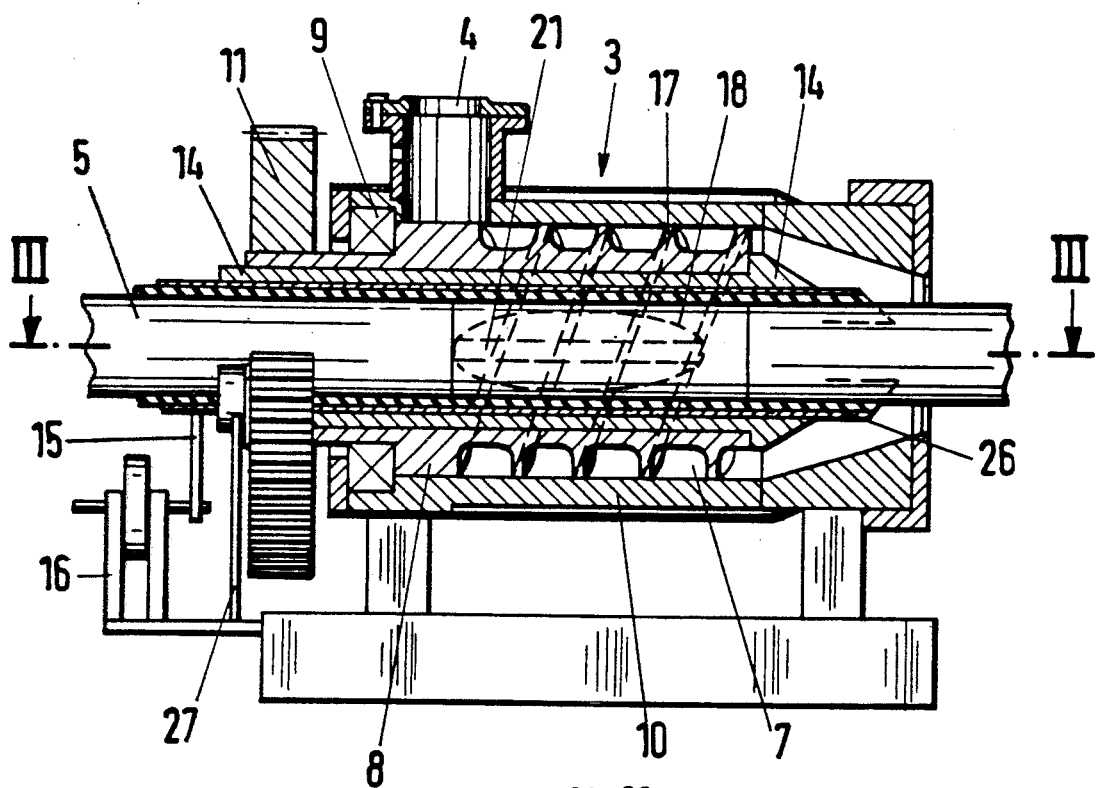
FIG. 2 is a longitudinal sectional view through a coating head forming part of an apparatus in accordance with the present invention.
Figure 3:
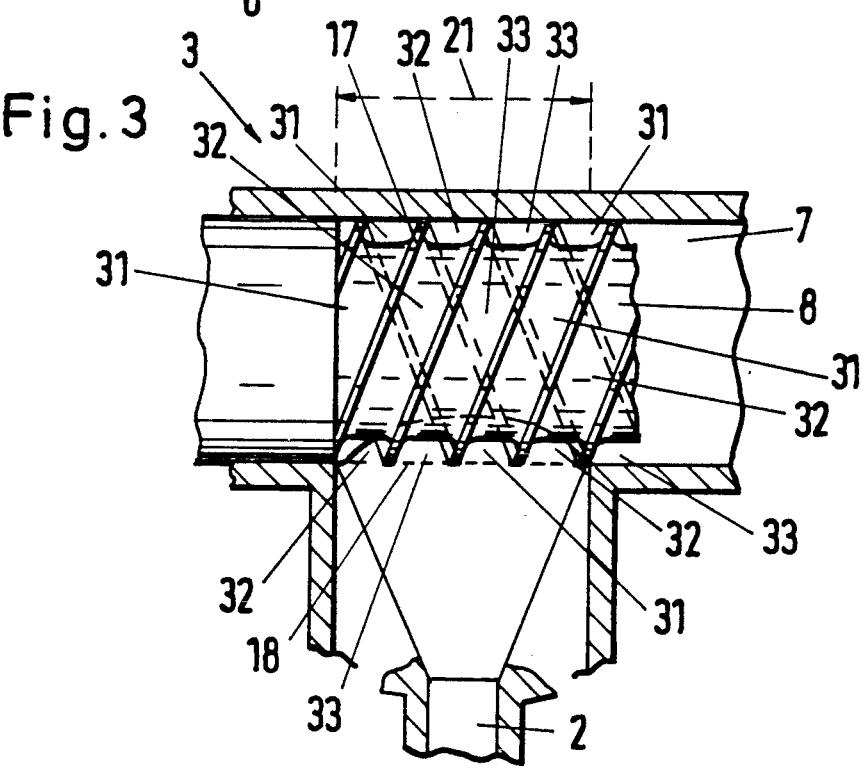
FIG. 3 is a sectional view taken along the line III—III of FIG. 2.
Figure 5:
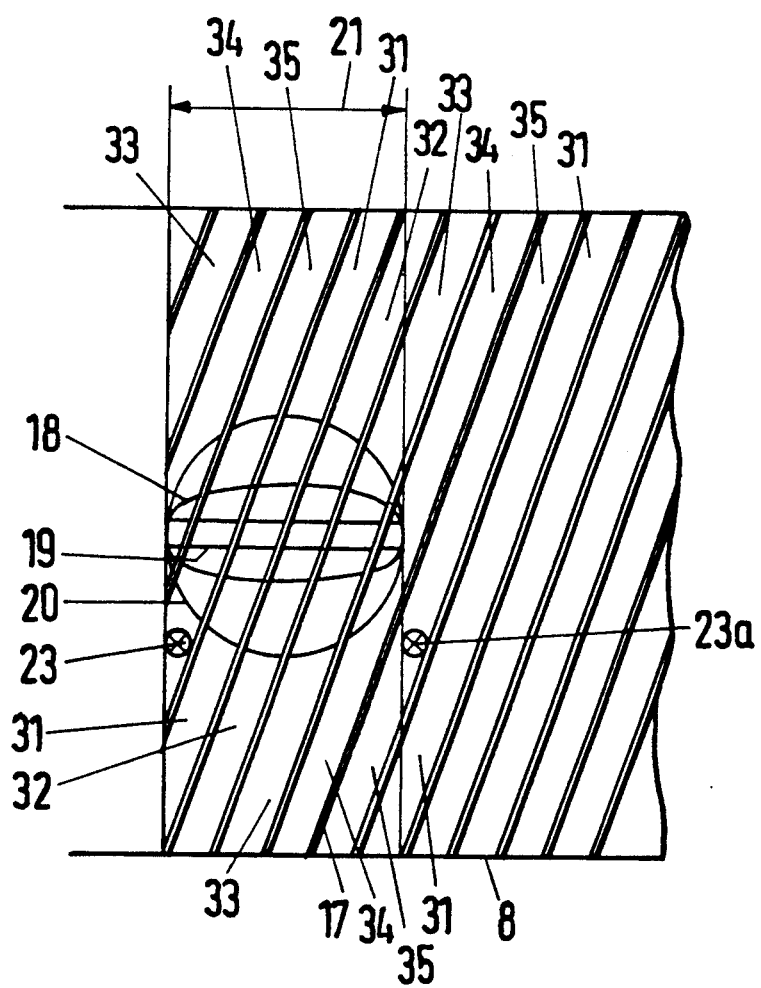
FIG. 5 shows a development of the surface of a sleeve-shaped material distributor in accordance with the present invention which has five conveyor threads.

For the sake of simplicity, the reference numerals used in FIGS. 1 and 4, which show a prior art arrangement, are also used in FIGS. 2, 3, 5 which show an apparatus in accordance with the present invention when they identify the same component parts.

The known coating apparatus shown in FIG. 1 comprises an extrusion device 1, which is connected to a coating head 3 by means of a flow channel 2. The coating head 3 is provided with a degassing aperture 4. A cylindrical body 5 to be coated is guided through the head 3 wherein it is coated with a layer of rubber 6. During such coating, the rubber mixture, which is prepared in the extrusion device 1, passes through the flow channel 2 into a distributor chamber 7, in which a sleeve-shaped material distributor 8 is disposed.

The material distributor 8 is mounted in a housing 10 in the form of a barrel by means of bearings 9 and carries a toothed drive wheel 11 at its upstream end. A pinion 12, driven by a motor 13, engages with the toothed drive wheel 11.

A stationary central tube 14 is coaxially disposed within the sleeve-shaped material distributor 8, but does not rotate with the latter. Such tube 14 is connected to a base plate by means of a frame-like assembly of rods 27. An axially displaceable guide sleeve 26 is disposed in the central tube 14. However, the guide sleeve 26 is adjusted to a desired position and is then retained stationary while the coating operation takes place. The sleeve 26 merely serves to guide the workpiece to be coated and is connected to a retaining bracket 16 by means of a further assembly of rods 15.

Helically-disposed conveyor flights 17 are provided on the external surface of the material distributor 8.

The flights 17 define a single threaded sleeve although double-threaded arrangements could also be utilized in accordance with the present invention.

In the embodiment shown in FIGS. 2, 3 and 5, the flow channel 2 connecting the extrusion device 1 to the coating head 3 has an elliptical cross-section, at least in the discharge region thereof where it opens into the head 3. The major axis of the ellipse is dimensioned so as to correspond to the axial pitch length of the helical conveyor flights, that is to say, after rotation through 360° around the material distributor 8.

FIG. 5 shows a development of the front end region portion of the material distributor 8. The material distributor 8 has five threads 31 through 35 formed thereon. In addition to the elliptical discharge aperture 18 of the flow channel 2, apertures having a slot-shaped cross-section 19 and a circular cross-section 20 are also shown. However, only one of these three possible types of discharge openings will actually be present.

If present, the length of the slot-shaped discharge cross-section 19 or the diameter of the circular discharge cross-section 20 is dimensioned to correspond to the axial pitch length 21 of one of the helical conveyor flights 17 after rotation through 360°.

By providing the discharge cross-sectional area of the flow channel 2 with such a dimension 21, all of the screw threads are uniformly filled with plasticised rubber, during one complete rotation of the distributor 8.

In consequence, each of the threads 31 through 35 is always uniformly filled, so that a totally uniform conveyor speed is produced in the conveyor threads 31 to 35. This is because the plasticised material travels along the inner wall of the housing 10. This is of great significance if a very homogeneous, bubble-free extrusion of the rubber mixture onto a metallic roller core 5 is to be attained.

A uniform filling operation is attained with, within reason, any desired number of threads so long as the major dimension of the discharge aperture 18, 19 or 20 correspond to the pitch length 21 of the screw threads.

It is important that, during a complete rotation of the distributor 8, all of the threads pass once with their pitch length beneath the cross-section of the discharge opening and, in consequence, are filled.

During a complete rotation of the distributor 8, material is conveyed from, for example point 23 in thread 35 (as shown in FIG. 5) to point 23a. This corresponds to an axial pitch length 21. Accordingly, all of the conveyor threads are filled during a 360° rotation and are accordingly constantly, and continuously, filled.

If, however, as can be seen in the prior art shown in FIG. 4, the major dimension of the discharge cross-section of the flow channel is shorter than one axial pitch length, only a small portion of the threads 41, 42 and 43 between the flights are filled during a 360° rotation. In the development shown in FIG. 4, this corresponds to the dotted area. The threads 44 and 45 are not full.

A partial filling of the threads produces a non-uniform coating thickness and enhances the risk of air bubbles or pockets being formed in the rubber mixture.

A particle of material, situated at point 24 in FIG. 4, reaches the point 24a after a 360° rotation, but because no material is present in some of the threads pump-like conveyor action is produced.

I claim:

1. An apparatus for the continuous coating of cylindrical workpieces with a resilient material, comprising:

an extrusion device for plasticizing the resilient material, said extrusion device defining an outlet for said plasticized material, flow channel means communicating with said outlet of said extrusion device, said flow channel means defining an inlet for receiving said plasticized material from said extrusion device and an outlet for said plasticized material, and coating head means communicating with said flow channel means and defining first inlet means for receiving said plasticized material from said outlet of said flow channel means and second inlet means for receiving said workpiece to be coated; said coating head means comprising hollow barrel means, plasticized material distributor means rotatably mounted within the hollow interior of said barrel means, and drive means for rotating said distributor means, said distributor means comprising a hollow sleeve having an external surface, and at least one screw flight helically disposed around said external surface and having a predetermined pitch length; said screw flight being rotatable by said drive means for said distributor means, said drive means comprising a drive motor and transmission means driven by said motor, said transmission means cooperatively engaging said distributor means upstream of said first inlet means defined by said barrel means; hollow tube means co-axially mounted within the hollow interior of said distributor means, said hollow tube means having an upstream end in the region of said transmission means and an opposed downstream end, and means for retaining said upstream end; guide sleeve means having upstream and downstream ends and disposed within said hollow tube means for guiding said workpieces through said coating head means, and means for mounting said guide sleeve means to permit axially displacement of said guide sleeve means with respect to said hollow tube means and for retaining said guide sleeve means at the upstream end thereof in a desired axial location with respect to said hollow tube means, and wherein said outlet of said flow channel means defines a discharge aperture the cross-section of which has a major dimension corresponding to said pitch length of said screw flight.

2. An apparatus as recited in claim 1, wherein said discharge aperture has an elliptical cross-section.

3. An apparatus as recited in claim 1, wherein said discharge aperture has a slot-shaped cross-section.

4. An apparatus as recited in claim 1, wherein said discharge aperture has a circular cross-section.

5. An apparatus as recited in claim 1, wherein said at least one screw flight comprises a single thread.

6. An apparatus as recited in claim 1, wherein said at least one screw flight comprises a plurality of threads.

7. An apparatus as recited in claim 1, wherein said inlet and said outlet of said flow channel have cross-sectional areas corresponding to one another.

* * * * *